UNITED STATES PATENT OFFICE.

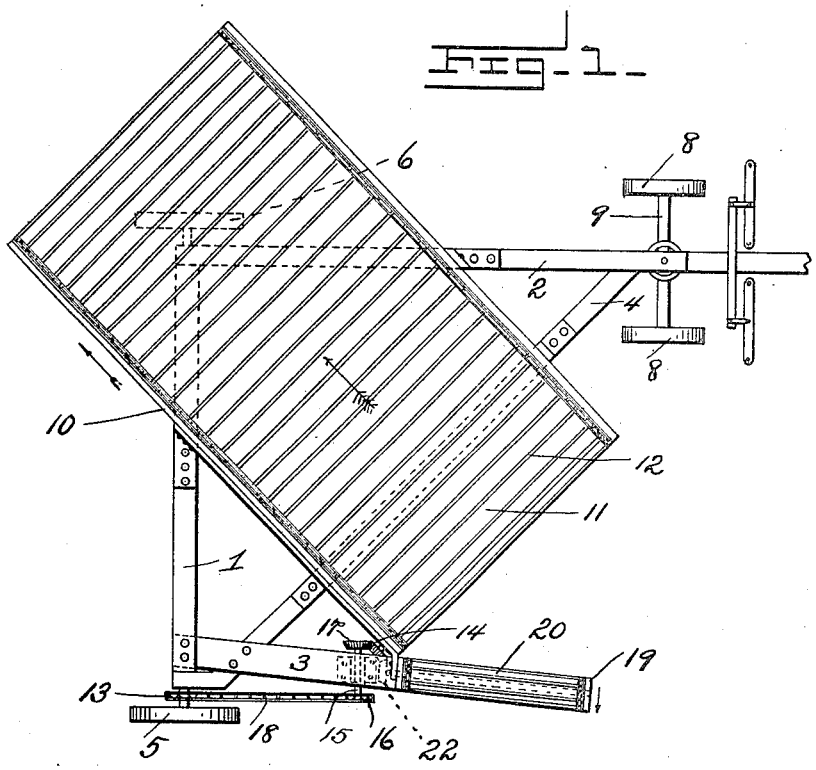
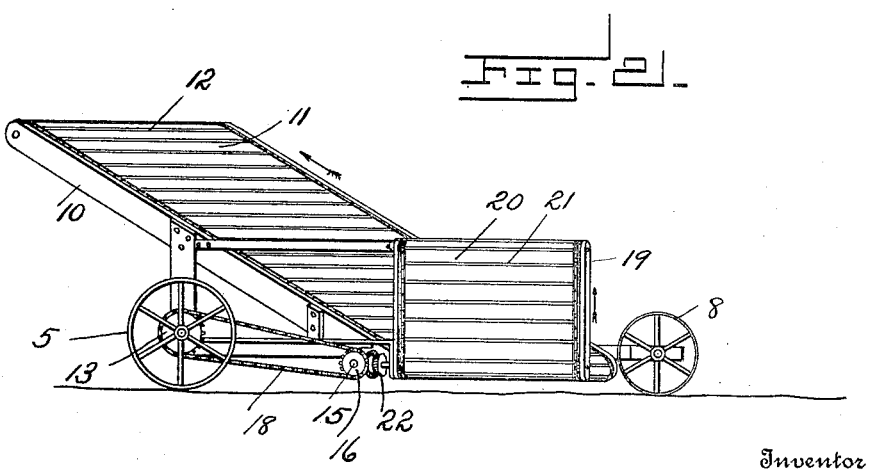

DANIEL D. HENRY, OF FORDVILLE, NORTH DAKOTA.

SHEAF-LOADER.

1,106,652. Specification of Letters Patent. Patented Aug. 11, 1914.

Application filed September 13, 1913. Serial No. 789,647.

*To all whom it may concern:*

Be it known that I, DANIEL D. HENRY, citizen of the United States, residing at Fordville, in the county of Walsh and State of North Dakota, have invented new and useful Improvements in Sheaf-Loaders, of which the following is a specification.

My present invention pertains to loading apparatus; and it contemplates the provision of a sheaf loader which by reason of its construction and relative arrangement of parts is reliable in operation and is possessed of high efficiency.

The invention in all of its details will be fully understood from the following description and claims when the same are read in connection with the drawings, accompanying and forming parts of this specification, in which:

Figure 1 is a plan view of the loader constituting the best practical embodiment of my invention that I have as yet devised. Fig. 2 is a side elevation of the loader.

Similar numerals of reference designate corresponding parts in both views of the drawings.

The main frame of the loader may be of any construction compatible with the purpose of my invention without involving departure from the scope of the same as claimed. I prefer, however, to have it comprise a rear transverse bar 1, a longitudinally-disposed side bar 2, fixed to and reaching forwardly from the left-hand end of the transverse bar, a comparatively short longitudinal bar 3 fixed to and extending forwardly from the right-hand end of the bar 1, and an oblique bar 4, fixed to the bars 1, 3 and 2 in any approved manner and disposed as shown.

The main frame described is wheel-supported, the wheels being preferably arranged as shown—i. e., two of the wheels 5 and 6 are mounted at the ends of the frame bar 1, while two wheels 8 are carried by a cross bar 9, connected with the forward portion of the frame bar 2. Arranged on and suitably connected with the main frame is a supplemental frame 10, and carried by the said supplemental frame is an endless apron 11 which is preferably, though not necessarily, made up of a canvas belt and spaced transverse slats 12 connected with said belt.

In furtherance of my invention the endless apron 11 and its frame are arranged at an angle of about 45 degrees to the frame bar 1 or to a line extending at right angles to the line of traverse of the loader; also, the apron 11 and its frame 10 are inclined upwardly from a point adjacent the ground at an angle of from twenty-five to thirty degrees so as to enable the apron to efficiently take sheaves from the ground and deliver the same to a wagon positioned at the left-hand side of the loader.

The apron 11 is preferably driven from the ground wheel 5 through the medium of a sprocket gear 13, fixed with respect to said wheel, a beveled gear 14 fixed on the lower shaft complementary to apron 11, a short shaft 15 journaled in the frame bar 3 and having a sprocket gear 16 at one end and also having a beveled gear 17 intermeshed with the gear 14, and a sprocket belt 18 connecting the sprocket gears 13 and 16. It will be manifest from this that forward movement of the loader will be attended by movement of the apron 11 in the direction indicated by arrow, Fig. 1.

Fixedly connected with the main frame and extending in a general upward direction therefrom is a second supplemental frame 19, and carried in said frame is an auxiliary apron 20. The said auxiliary 20 is designed to serve as a guard in confining sheaves in proximity to the forward, lower portion of the loading apron 11, and it is also designed and adapted to assist in or contribute toward putting sheaves on the lower forward portion of the apron 11. Said apron 20 is preferably, though not necessarily, made up of a canvas belt and spaced transverse slats 21 fixed to the said belt. In furtherance of my invention the auxiliary apron 20 extends forwardly from the rear end of the foremost portion of the apron 11 and is disposed at an acute angle to said foremost portion as is essential to successful operation of the machine. Manifestly the apron 20 might be driven in any approved manner without effecting my invention. I prefer, however, to drive it in the manner shown—that is, through the medium of a beveled gear 22, fixed on the lower shaft complementary to the apron 20 and intermeshed with the beveled gear 14.

The operation of the loader is as follows: On forward movement of the loader the sheaves received between the aprons 11 and 20 are put or taken on the lower portion of the apron 11 and are carried upwardly and rearwardly on said apron 11 and delivered from the upper portion thereof to a wagon or other apparatus positioned at the side of the loader to receive the sheaves. The apron 20 assists in placing sheaves on the apron 11 by confining sheaves between it and the lower forward portion of said apron 11, and also by reason of the upward movement of its inner stretch tending to lift the sheaves so confined, so that the lower forward portion of the apron 11 can pass under the sheaves.

Having described my invention, what I claim and desire to secure by Letters Patent, is:

1. In a loader, the combination of carrying means, conveying means extending at an angle of approximately forty five degrees to the line of traverse of the carrying means; the said conveying means being also inclined upwardly and rearwardly from a point adjacent the ground at an angle of approximately thirty degrees, and an upstanding conveyer extending forwardly at an acute angle to the foremost portion of the first-named conveyer.

2. A loader having two conveyers, one conveyer arranged to travel with one end near the ground at an angle to the line of traverse, the other end of the conveyer being elevated, and the second conveyer being arranged in upstanding position at an angle of less than ninety degrees from the rear end of the foremost portion of the first-named conveyer.

3. In a loader, the combination of a wheel-supported main frame, an apron supported on said frame and inclined to the line of the traverse thereof and also inclined upwardly or rearwardly, a second upstanding apron carried by the main frame and extending forwardly from the rear end of the foremost portion of the first-named apron, and means for driving the said aprons.

In testimony whereof I have hereunto set my hand in presence of two subscribing witnesses.

DANIEL D. HENRY.

Witnesses:
A. O. ROTMAN,
ARTHUR WOOD.

---

Copies of this patent may be obtained for five cents each, by addressing the "Commissioner of Patents, Washington, D. C."